US012755865B2

(12) United States Patent
Yuan et al.

(10) Patent No.: US 12,755,865 B2
(45) Date of Patent: Oct. 6, 2026

(54) ALUMINA FILM STRUCTURE FOR HEAT DISSIPATION OF A BARE CONDUCTOR UNDER HIGH VOLTAGE, AND A METHOD FOR PREPARING THE SAME

(71) Applicant: CHONGQING UNIVERSITY, Chongqing (CN)

(72) Inventors: Yuan Yuan, Chongqing (CN); Guoyong Liu, Chongqing (CN); Xu Dai, Chongqing (CN); Huiying Xiang, Chongqing (CN); Ruijin Liao, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 19/145,657

(22) PCT Filed: Dec. 18, 2023

(86) PCT No.: PCT/CN2023/139469

§ 371 (c)(1),
(2) Date: Jul. 3, 2025

(87) PCT Pub. No.: WO2024/244395

PCT Pub. Date: Dec. 5, 2024

(65) Prior Publication Data

US 2026/0120920 A1 Apr. 30, 2026

(30) Foreign Application Priority Data

May 29, 2023 (CN) ......................... 202310617912.2

(51) Int. Cl.
*H01B 7/42* (2006.01)
*C25D 11/06* (2006.01)
(Continued)

(52) U.S. Cl.
CPC ............. *H01B 7/421* (2013.01); *C25D 11/06* (2013.01); *H01B 1/023* (2013.01); *H01B 13/22* (2013.01)

(58) Field of Classification Search
CPC ........ H01B 7/421; H01B 1/023; H01B 13/22; H01B 9/00; H01B 7/42; C25D 11/06; C25D 11/08; C25D 11/10
(Continued)

(56) References Cited

U.S. PATENT DOCUMENTS 3,889,042 A * 6/1975 Mears .................... H01B 3/006 174/15.1
5,212,013 A * 5/1993 Gupta .................... H01B 3/105 428/384
(Continued)

FOREIGN PATENT DOCUMENTS

CN 87100618 A 8/1987
CN 1974873 A 6/2007
(Continued)

OTHER PUBLICATIONS

PCT International Search Report and Written Opinion mailed on Mar. 7, 2024 for PCT/CN2023/139469 of which the subject application is the U.S. national phase application.

*Primary Examiner* — Angel R Estrada
(74) *Attorney, Agent, or Firm* — Wood, Phillips, Katz, Clark & Mortimer

(57) ABSTRACT

An aluminum oxide film structure for heat dissipation and cooling of a high-voltage bare conductor and a preparation method, relating to the technical field of wires and cables. The aluminum oxide film structure is an aluminum oxide film layer having a single hole or dual-layer composite hole structure and generated on the outermost surface of a pure aluminum conductor or aluminum conductor aluminum clad steel reinforced; the thickness of the aluminum oxide film
(Continued)

layer is 15-30 μm; the hole gap range of single holes or dual-layer composite holes is 100-300 nm; and the hole diameter range of the single holes or the dual-layer composite holes is 30-300 nm. Compared with a bare conductor, the aluminum oxide film structure enables an aluminum conductor or an aluminum stranded conductor to have low-current temperature rise characteristics at the same current and better faster heat dissipation and cooling characteristics.

9 Claims, 11 Drawing Sheets

(51) Int. Cl.
*H01B 1/02* (2006.01)
*H01B 13/22* (2006.01)

(58) Field of Classification Search
USPC ................................ 174/212, 252, 256, 260
See application file for complete search history.

(56) References Cited

U.S. PATENT DOCUMENTS

| | | | | |
|---|---|---|---|---|
| 9,048,005 | B2 * | 6/2015 | Holloway | H01B 1/023 |
| 9,947,917 | B2 * | 4/2018 | Seki | H01G 11/50 |
| 10,714,233 | B2 * | 7/2020 | Uchiyama | H01B 7/02 |
| 10,804,006 | B2 * | 10/2020 | Hosomizu | H01B 3/441 |
| 11,532,407 | B2 * | 12/2022 | Chen | H01B 1/023 |
| 2014/0238867 | A1 | 8/2014 | Ranganathan et al. | |

FOREIGN PATENT DOCUMENTS

| | | | |
|---|---|---|---|
| CN | 101624717 | A | 1/2010 |
| CN | 101752023 | A | 6/2010 |
| CN | 103981557 | A | 8/2014 |
| CN | 107002273 | A | 8/2017 |
| CN | 112277406 | A | 1/2021 |
| CN | 113450945 | A | 9/2021 |
| CN | 114678159 | A | 6/2022 |
| CN | 115831461 | A | 3/2023 |
| EP | 1870907 | A1 | 12/2007 |
| KR | 20160085617 | A | 7/2016 |
| WO | 2022180332 | A1 | 9/2022 |

* cited by examiner

ALUMINA FILM STRUCTURE FOR HEAT DISSIPATION OF A BARE CONDUCTOR UNDER HIGH VOLTAGE, AND A METHOD FOR PREPARING THE SAME

TECHNICAL FIELD

The present invention relates to the technical field of transmission lines and cables, and in particular to an alumina film structure for heat dissipation of a bare conductor under high voltage, and a method for preparing the same.

BACKGROUND

High-voltage power lines typically refer to transmission lines operating at voltages of 10 kV or higher. At present, Aluminum Conductors Steel Reinforced (ACSR) is commonly used, wherein the steel core mainly provides mechanical strength while the aluminum stranded conductor is mainly responsible for electrical transmission. The transmission methods for high-voltage power lines are as follows: in urban areas, insulated underground cables are commonly used, while in rural or open areas, overhead transmission lines (OHL) supported by transmission towers are commonly used. Specifically, 10 kV high-voltage distribution lines in urban areas are typically equipped with insulated conductors, while high-voltage transmission lines operating at 35 kV or higher predominantly use bare conductors.

With the rapid development of the economy and society, the growing demand for electricity has presented new challenges to the transmission capability of the power grid. At present, amapacity enhancement technologies are regarded as a promising solution to address insufficient transmission capability. Amapacity enhancement methods for conductors are generally classified into static amapacity enhancement and dynamic amapacity enhancement. Static amapacity enhancement method includes techniques such as ultra-high voltage (UHV) transmission, dynamic reactive power compensation, Flexible AC Transmission Systems (FACTS), compact transmission, the use of large cross-section heat-resistant conductors, and increasing the allowable operating temperature of conductors. Among these, increasing the allowable operating temperature to 80° C. or even 90° C. can enhance transmission capability by approximately 20% and 35%, respectively. This method is relatively easy to implement. However, it necessitates careful consideration of factors such as the mechanical load-bearing capability of supporting fittings, the service life of transmission lines, and thermal impacts on associated components (e.g., conductor fittings). In contrast, other amapacity enhancement methods often require the construction of new transmission lines, which involve high capital investment, strict environmental regulations, and complex maintenance requirements.

However, during sustained high-load operation, high-voltage power lines experience heat accumulation within the conductors, resulting in an elevated ambient temperature. Especially during extremely hot summer conditions, industrial and residential electricity demand increases substantially. Under such circumstances, increasing the maximum allowable operating temperature of transmission conductors is commonly adopted as the primary strategy for amapacity enhancement. Nevertheless, this strategy inevitably leads to a further rise in the internal temperature of the conductor. On the other hand, ambient temperatures are already high during the summer, and the rise in the internal temperature of a conductor and ambient temperature can mutually reinforce each other, significantly impacting the performance and operational safety of the transmission lines. Furthermore, when the conductor temperature exceeds a critical threshold, sagging of the conductor occurs. The degree of sagging is positively correlated with the temperature. If the sagging conductor becomes too close to buildings or other structures, it may trigger secondary safety hazards. In addition, as the conductor temperature rises, its electrical resistance increases, leading to higher transmission losses.

To address the problem of heat dissipation of transmission lines, two primary methods are currently employed: passive heat dissipation and active heat dissipation. Passive heat dissipation relies on heat convection through environmental factors such as air and wind. However, this method is highly dependent on external conditions, resulting in unstable performance and generally limited heat dissipation efficiency. Among active heat dissipation techniques, one widely adopted method is to apply a heat-dissipating coating to the conductor surface. These coatings function through thermal conduction and radiation to quickly dissipate heat to achieve the purpose of heat dissipation. However, such coatings primarily function by reflecting solar radiation, rather than dissipating internally generated heat (joule heating) within the conductor. Moreover, heat-dissipating coatings typically exhibit low thermal conductivity and may increase the electrical resistance of the conductor. Certain heat-resistant conductors, particularly those based on aluminum conductor steel reinforced (ACSR), achieve enhanced thermal tolerance by alloying the aluminum with elements such as zirconium. However, the incorporation of alloying elements involves complex preparation processes and results in high manufacturing costs.

In summary, there is an urgent need for an economical and simple technical solution for heat dissipation of a bare conductor under high voltage.

SUMMARY

In view of this, the objective of the present invention is to provide an alumina film structure for heat dissipation of a bare conductor under high voltage, and a method for preparing the same. The specific technical solutions are provided as follows.

An alumina film structure for heat dissipation of a bare conductor under high voltage, wherein the alumina film structure is a porous alumina film layer formed on a surface of an outermost layer of an aluminum conductor or an aluminum stranded conductor, the porous alumina film layer comprises a single-layer or two-layer composite porous structure; a thickness of the porous alumina film layer is 15-30 μm; a pore spacing of the single-layer or two-layer composite porous structure is in the range of 100~300 nm; a pore diameter of the single layer or two-layer composite porous structure is in the range of 30~300 nm (thereby enabling convective transfer).

Preferably, the pore spacing of the single-layer or two-layer composite porous structure is in the range of 100~200 nm.

In the present invention, the two-layer composite porous structure is configured to comprise an upper layer and a lower layer, wherein an upper pore diameter of an upper pore in the upper layer is larger than a lower pore diameter of a lower pore in the lower layer; and the number of the upper pore in the upper layer is less than the number of the lower pore in the lower layer.

Further, the bare conductor under high voltage is an all-aluminum conductor or an aluminum conductor steel-reinforced (ACSR), an outermost layer of the aluminum conductor steel-reinforced is a single wire of aluminum; a diameter of the bare conductor under high voltage comprises 3 mm, 7 mm, 10 mm, 15 mm, or 20 mm.

The present invention also provides an all-aluminum conductor with the above-mentioned alumina film structure on an outermost layer, or an aluminum conductor steel-reinforced (ACSR) comprising low temperature rise and active heat dissipation properties.

A preparation method for the above-mentioned alumina film structure, wherein the method comprises immersing an all-aluminum conductor or an aluminum stranded conductor in an electrolyte and performing an anodization process to form a porous alumina film structure with a thickness of 15-30 μm, comprising the following steps:

- Step 1: connecting an all-aluminum conductor or an aluminum stranded conductor to an anode output of a power supply of a device, and starting a circulating cooling system of the device before the anodization process to ensure that the electrolyte is cooled via circulation between a cooler and an electrolytic tank and is maintained at about 25° C. during the anodization process;
- Step 2: preparing the electrolyte by mixing water and an acid solution, and adding the electrolyte into the electrolytic tank; wherein the electrolyte comprises sulfuric acid, phosphoric acid, oxalic acid, a sulfuric acid/chromic acid mixture, a sulfuric acid/oxalic acid/chromic acid mixture, or a nitric acid/chromic acid mixture;
- Step 3: turning on the power supply and performing the anodization process by applying a current density of 0.04 A/cm$^2$~0.3 A/cm$^2$ for an anodization duration of 8 min~25 min.

The electrolyte used in the present invention may comprise a single strong acid, such as sulfuric acid or nitric acid, or a mixed acid, such as a sulfuric/chromic acid mixture, a sulfuric/oxalic/chromic acid mixture, or a nitric/chromic acid mixture. When a strong acid is employed as the electrolyte for the anodization process, the fully dissociated hydrogen ions may accelerate the oxidation reaction excessively, rendering it difficult to control. In contrast, acids such as chromic acid or oxalic acid exhibit only partial dissociation of hydrogen ions. Accordingly, mixing such acids with strong acids can stabilize the oxidation reaction.

Further, the current density is controlled by regulating a voltage during the anodization process, and the voltage is in the range of 50 V~100 V.

Further, the current density comprises 0.04 A/cm$^2$, 0.13 A/cm$^2$, 0.27 A/cm$^2$, or 0.3 A/cm$^2$.

Further, the anodization duration comprises 8 min, 10 min, 20 min, or 25 min.

Further, a concentration of a chloride ion in the water is controlled within the range of 0-15 mg/L.

Further, the voltage is in the range of 70 V-90 V.

Use of a porous alumina film structure in heat dissipation of a bare conductor under high voltage, wherein a thickness of the porous alumina film structure is 15-30 μm; the porous alumina film structure is a single-layer or two-layer composite porous structure; a pore spacing of the single-layer or two-layer composite porous structure is in the range of 100~300 nm; a pore diameter of the single-layer or two-layer composite porous structure is in the range of 30~300 nm; the porous alumina film structure is for heat dissipation of a conductor after amapacity enhancement.

Beneficial Technical Effects (1) The present invention provides a porous alumina film structure for heat dissipation of a bare conductor under high voltage. The porous alumina film structure is formed on the surface of an outermost layer of an aluminum conductor or an aluminum stranded conductor. Compared with bare conductors, the porous alumina film structure enables the aluminum conductor or the aluminum stranded conductor to exhibit a lower temperature rise at the same current, along with enhanced heat dissipation performance.

(2) The porous alumina film structure formed on the surface of the outermost layer of the aluminum conductor or the aluminum stranded conductor, as disclosed in the present invention, has a specific thickness that does not adversely affect the conductive capability of the conductor nor increase its AC resistance—thereby breaking the conventional understanding of those skilled in the art. It is widely known by those skilled in the art that conductors are subject to the skin effect. When alternating current and electromagnetic field is applied to a conductor, the current is not evenly distributed throughout the conductor. Instead, the current tends to concentrate near the surface ("skin") of the conductor. In other words, the current tends to concentrate in a thin layer at the outer surface of the conductor. The closer to the surface, the higher the current density, while the current in the interior of the conductor is lower. As a result, the resistance of the conductor increases, leading to greater power loss. This phenomenon is known as the skin effect. As alumina is an electrical insulator with a resistivity in the range of $10^{14}$-$10^{16}$ Ω·cm, it is generally believed that its application would increase the resistance of the conductor. However, experimental results of the present invention confirm that the formation of the porous alumina film structure provided by the present invention with specific thickness and structural characteristics on the surface of the aluminum conductor does not increase the resistance of the conductor. However, an increase in resistance is observed only when the thickness of the porous alumina film structure falls outside the specified range defined by the present invention.

(3) Furthermore, the conductor comprising the porous alumina film structure of the present invention exhibits slightly lower resistance than bare conductors.

(4) The preparation method of the porous alumina film structure provided by the present invention is simple and suitable for large-scale industrial production. In particular, the use of tap water to prepare the electrolyte makes the production costs more controllable, as the cost of preparing the electrolyte with tap water is significantly lower than that with distilled water, and tap water is more readily available. Therefore, the preparation method of the present invention is more applicable for large-scale industrial production and practical applications. However, certain substances present in tap water may cause corrosion pits on the surface of the aluminum conductor or aluminum stranded conductor. The present invention further confirms that chloride ions in tap water are responsible for the formation of such corrosion pits. By controlling the concentration of chloride ions, such corrosion effects can be mitigated to an acceptable level, thereby overcoming a technical barrier.

DESCRIPTION OF DRAWINGS

To make the embodiments of the present invention or the technical solutions in the prior art clearer, the drawings required to be used in the description of the embodiments or the prior art will be briefly introduced below. It is obvious that the drawings described below are some embodiments of the present invention, and that other drawings can be obtained from these drawings for those of ordinary skill in the art without making inventive effort.

DETAILED DESCRIPTION

Figure 1:
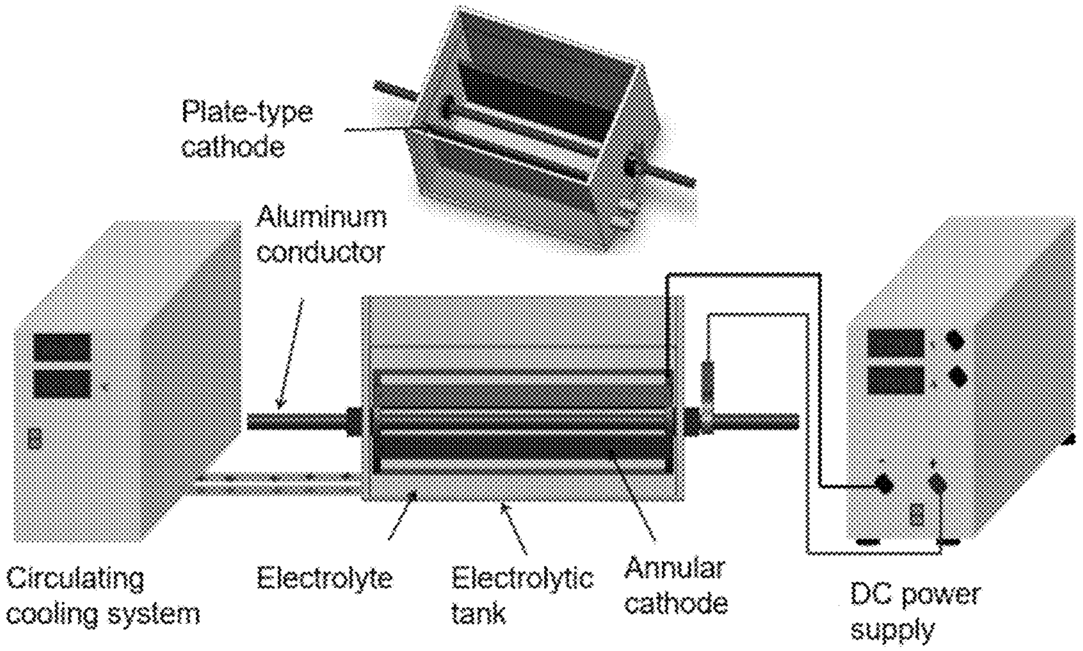
FIG. 1 is a schematic diagram of an anodization device for an aluminum conductor.

To make the objective, the technical solutions and advantages of the embodiments of the present invention clearer, the technical solutions of the embodiments of the present invention will be clearly and completely described below in combination with drawings. It is obvious that the described embodiments are some of the embodiments of the present invention, not all of the embodiments. Based on the embodiments of the present invention, all other embodiments obtained by those of ordinary skill in the art without making inventive effort shall belong to the protection scope of the present invention.

It should be noted that the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a (n) . . . " in which an element is defined will not preclude presence of an additional identical element(s) in a process, method, article or device comprising the defined element(s) unless further defined.

As used herein, the term "about", typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Definition

As used in the present invention, the term "pore spacing" refers to the distance between adjacent pores.

As used in the present invention, the term "pore diameter" refers to the size of a pore.

As used in the present invention, the term "single-layer porous structure" refers to a configuration consisting of a single layer of nano-scale micropores, and may also be referred to as a "single pore".

As used in the present invention, the term "two-layer composite porous structure" refers to a configuration comprising upper and lower layers of nano-scale micropores, and may also be referred to as a "composite pore".

It can be understood that the term "alumina film structure" used in the following embodiments refers to the porous alumina film structure as disclosed in the present invention.

Embodiment 1

This embodiment provides a preparation process and procedure for anodizing an aluminum conductor.

Samples: The test aluminum conductors include all-aluminum conductor (Al 1060, in accordance with GB/T3190-1996) and JL/LB 120/20 Aluminum Conductor Steel-Reinforced.

Preparation device: The device comprises a DC power supply (100 A/200 V), a circulating cooling system, an electrolytic tank, and a cathode. The electrolytic tank is 50 cm wide, with openings at both ends. The aluminum conductor to be treated is placed inside the electrolytic tank, and both ends are sealed with sealing rings. A schematic diagram of the anodizing device for the aluminum conductor is shown in FIG. 1.

Classification of electrodes: Two types of cathodes are used: (1) two 304 stainless steel cathode plates, each measuring 50 cm×20 cm; and (2) an annular cathode composed of six stainless steel plates, each measuring 50 cm×7 cm, with the overall diameter of the annular cathode being 20 cm.

Specific procedure: Connect the aluminum conductor to be treated to the anode output of the power supply. Before the anodization process, start the circulating cooling system to ensure that the electrolyte is cooled via circulation between a cooler and an electrolytic tank and is maintained at about 25° C. during the anodization process. For each anodization treatment, a 50 cm-long segment of the aluminum conductor is used. Conductor segments of other lengths may be prepared as needed.

Electrolytes: sulfuric acid, phosphoric acid, oxalic acid, a sulfuric acid/chromic acid mixture, a sulfuric acid/oxalic acid/chromic acid mixture, or a nitric acid/chromic acid mixture.

Diameters of a single wire of aluminum: 3 mm, 7 mm, 10 mm, 15 mm, and 20 mm.

Current densities: 0.01 A/cm$^2$~0.3 A/cm$^2$.

Anodization durations: 5 min~30 min.

Anodization voltages: 70 V~90 V.

Ambient wind speed: 0-5 m/s.

Embodiment 2

Method for Adjusting a Current Density by Regulating a Voltage

During the preliminary experimental phase of the present invention, aluminum plates are used as the experimental material. By regulating the applied voltage, different current densities per unit area passing through the aluminum plate are obtained. When the anodized material is an aluminum conductor, the required voltage can be calculated based on the target constant current density and the effective surface area of the aluminum conductor. In this manner, the current density during the anodization process may be controlled by regulating the applied voltage.

Embodiment 3

Electrical Performance Test of Aluminum Conductors Prepared in Embodiment 1

(1) Electrical Conductivity

According to methods described in the literature, the DC resistance of the aluminum conductor is measured using a standard four-point probe method at an ambient temperature of 20° C. Since the anodization process primarily forms an insulating alumina film on the surface of the outermost layer of a single wire of aluminum or the surface of an aluminum conductor, a single wire of aluminum is selected as the test sample. A specialized fixture is employed to clamp the two current leads and two voltage leads at both ends of the conductor. Inner leads are used for voltage measurement, while outer leads are used for current supply. Prior to testing, the diameter d (in mm) of the single wire of aluminum and the length L (in meters) between the voltage leads are measured. The resistivity p is calculated using the following formula:

$$p = U\pi D^2/4LI$$

Here, I represents the current (A) passing through the conductor, provided by a Keithley 2400 current source (maximum output: 1 A), and U represents the voltage measured using a Keithley 2010 multimeter. During testing, the current is increased in 100 mA increments, and the corresponding voltage is recorded at each step. The test is terminated once the current reaches 1 A. The slope of the resulting I-U curve is taken as the resistance of the sample segment. Each sample is tested three times, and the average value is used as the final measurement. The electrical conductivity of the conductor is calculated using the following formula:

$$\%\ IACS = (0.172/p) \times 100\%$$

(2) Current-Induced Temperature Rise Test

Figure 2:
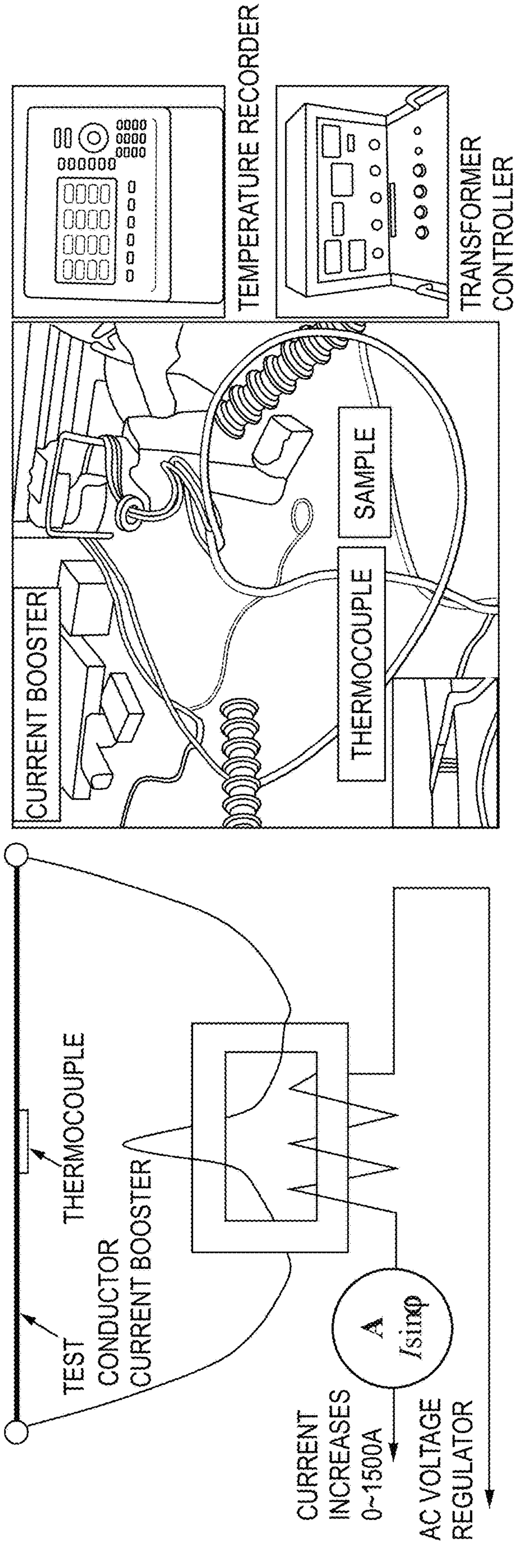
FIG. 2 is a schematic diagram of a test platform for measuring current-induced temperature rise in an aluminum conductor.

A schematic diagram of a test platform for measuring current-induced temperature rise in an aluminum conductor is shown in FIG. 2. The platform mainly comprises a transformer controller, a current booster, a temperature recorder, a temperature sensor, and a test conductor. The test conductor is an all-aluminum conductor or an Aluminum Conductor Steel-Reinforced, with a length of 3 meters. The temperature sensor is fixed at the midpoint of the conductor and connected to a thermocouple to monitor the surface temperature of the conductor as the current increases. The ends of the conductor are connected to the output terminals of the current booster. The magnitude of the current passing through the conductor is regulated using the transformer controller. After each current increment, the conductor temperature is recorded once it stabilizes, and the next temperature rise step is then carried out. This process generates a temperature-versus-current curve of the conductor.

Embodiment 4

Investigation and Experimental Verification of Various Factors

1. Effect of Alumina Film Thickness on Heat Dissipation

Figure 3:
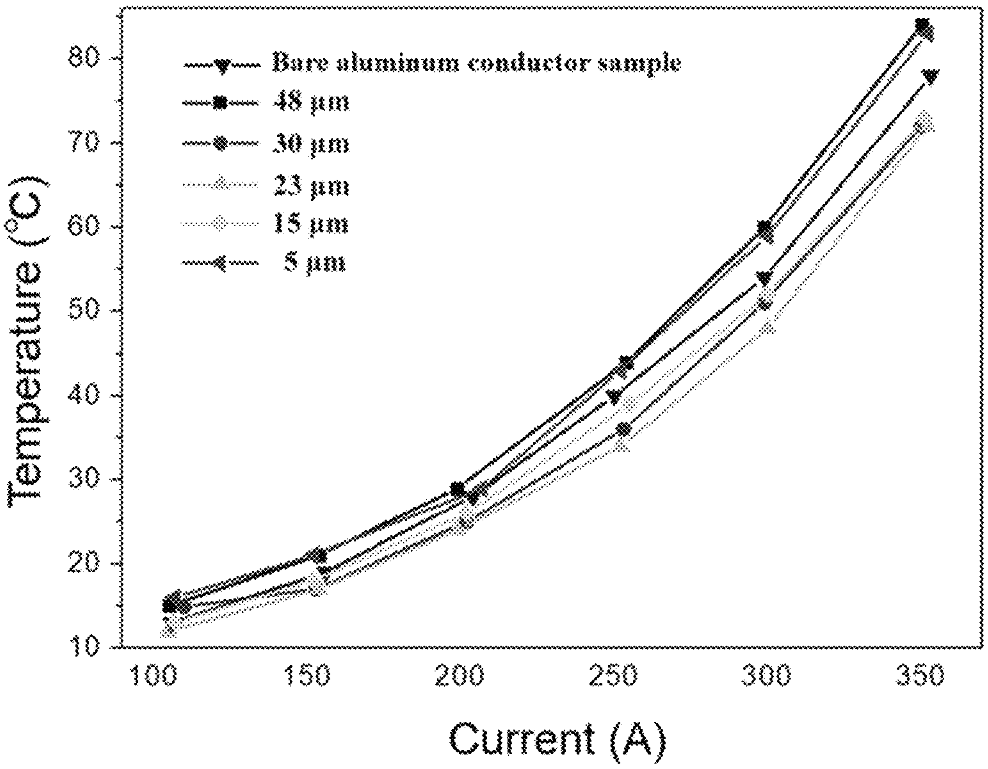
FIG. 3 is a graph showing the current-induced temperature rise of porous alumina film structures with different thicknesses.
Figure 4:
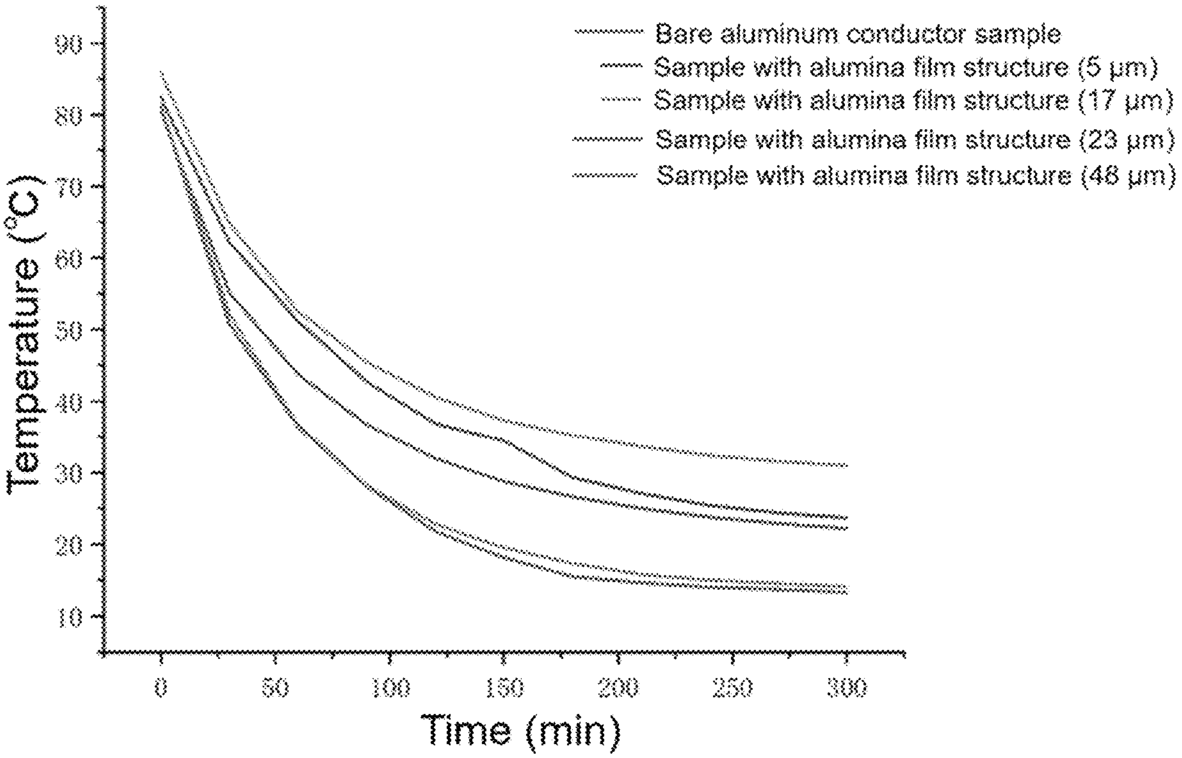
FIG. 4 is a graph showing the heat dissipation performance of aluminum conductors with porous alumina film structures with different thicknesses.

The porous alumina film structure provided by the present invention has a thickness in the range of 15~30 μm. When the thickness is less than 15 μm, the heat dissipation performance is insufficient; when the thickness exceeds 30 μm, the heat dissipation performance is also insufficient, and electrical resistance increases, as shown in FIGS. 3 and 4.

In this embodiment, alumina film structures with thicknesses of 5 μm, 15 μm, 23 μm, 30 μm, and 48 μm are provided, with a bare conductor used as the control. According to the heat dissipation tests and the resistance test results shown in Table 1, both excessively thin and excessively thick alumina films exhibit poor heat dissipation performance. Calculations also revealed that alumina film structures that are excessively thin or excessively thick lead to increased alternating current (AC) resistance, thereby increasing energy loss. Accordingly, the film thickness range of 15~30 μm is determined to be optimal for achieving effective heat dissipation and reducing energy loss.

TABLE 1

Resistance data of alumina films with different thicknesses

| Sample | $R_{AC}$ (Ω/km) |
|---|---|
| Bare alumina conductor sample | 0.9778 |
| Film, 48 μm (thickness) | 1.6843 |
| Film, 30 μm (thickness) | 0.9302 |
| Film, 23 μm (thickness | 0.8024 |
| Film, 15 μm (thickness) | 0.9093 |
| Film, 5 μm (thickness) | 1.1152 |

Figure 5:
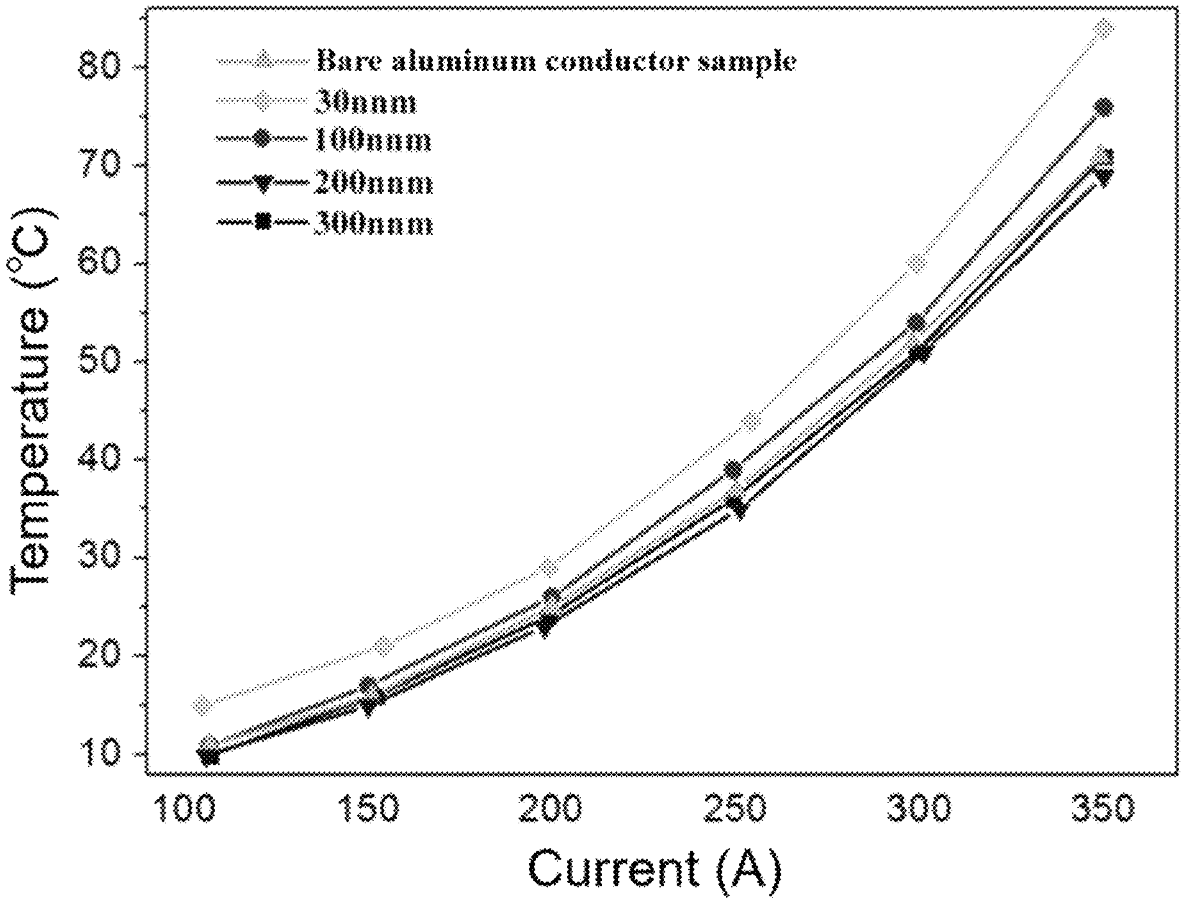
FIG. 5 is a graph showing the heat dissipation performance of porous alumina film structures with different pore spacings under normal current conditions.

2. Heat Dissipation Test Under Normal Current Conditions for Different Pore Spacings FIG. 5 shows the heat dissipation results of two-layer composite porous alumina films with different pore spacings under normal current conditions (A).

Figure 6:
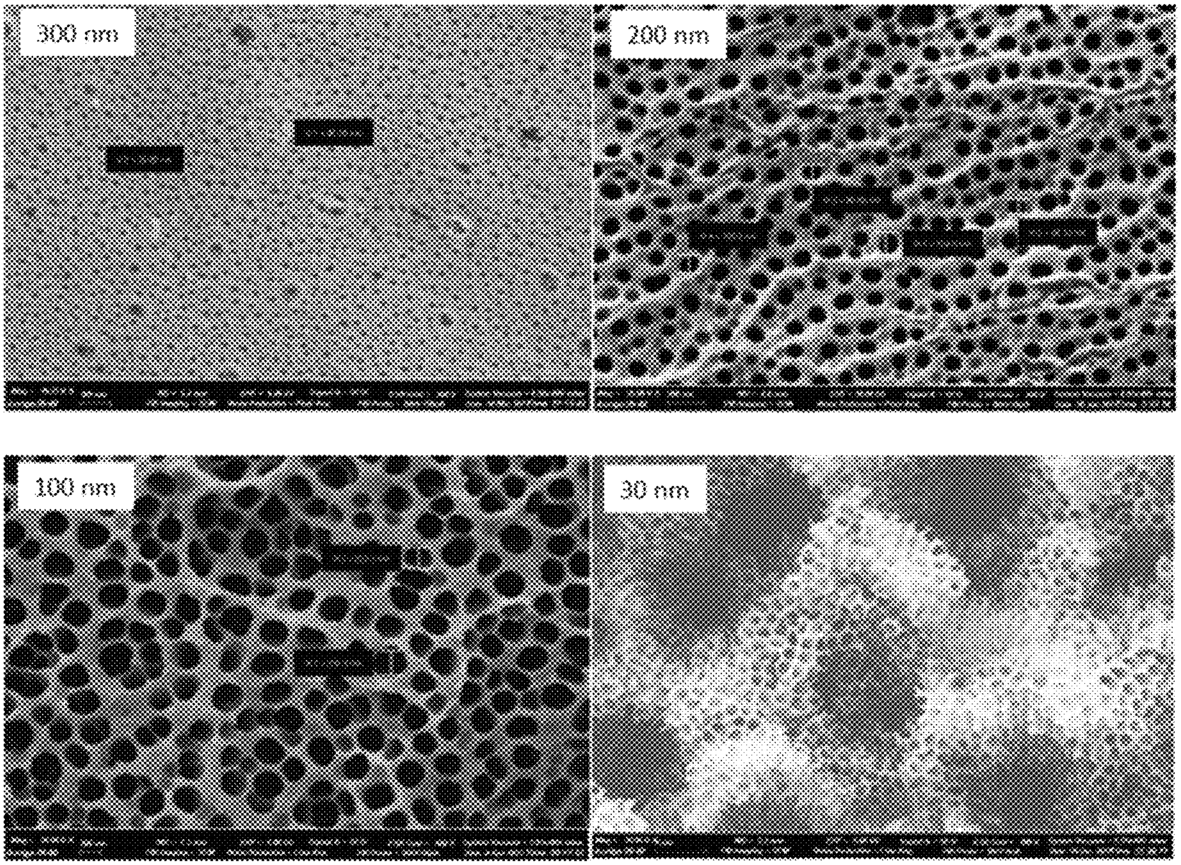
FIG. 6 is an SEM image of the microstructure of pores with different pore spacings.

A bare aluminum conductor is used as the control. Experimental results indicate that conductors with alumina films having a pore spacing of 30 nm exhibit a higher temperature rise compared to the bare conductor as current increases. At a pore spacing of 100 nm, the temperature rise remains slightly higher than that of the bare conductor. In contrast, at pore spacings of 200 nm and 300 nm, the temperature rise is lower than that of the bare conductor. The corresponding microscopic image of the porous structures with different pore spacings is shown in FIG. 6.

It can be understood that under normal current conditions, the heat dissipation performance of the porous alumina film structure is not markedly superior to that of a bare conductor. This is attributed to the relatively low heat generation within the conductor under such conditions, which limits the observable heat dissipation benefits of the alumina film. However, under elevated or high current conditions, the porous alumina film structure of the present invention exhibits a pronounced and advantageous heat dissipation performance.

3. Heat Dissipation Test Under High Current Conditions

Table 2 presents the current values of different aluminum conductors at 70° C. According to relevant China's standards, 70° C. is the maximum allowable operating temperature for all-aluminum conductors used in power transmission. Exceeding this temperature threshold may lead to sagging of the conductors, thereby posing significant safety risks.

TABLE 2

| Test item | Current at 70° C. |
|---|---|
| Bare aluminum conductor (control) | 644 A |
| Aluminum conductor with single-layer porous structure | 711 A |
| Aluminum conductor with composite porous structure | 745 A |

Figure 7:
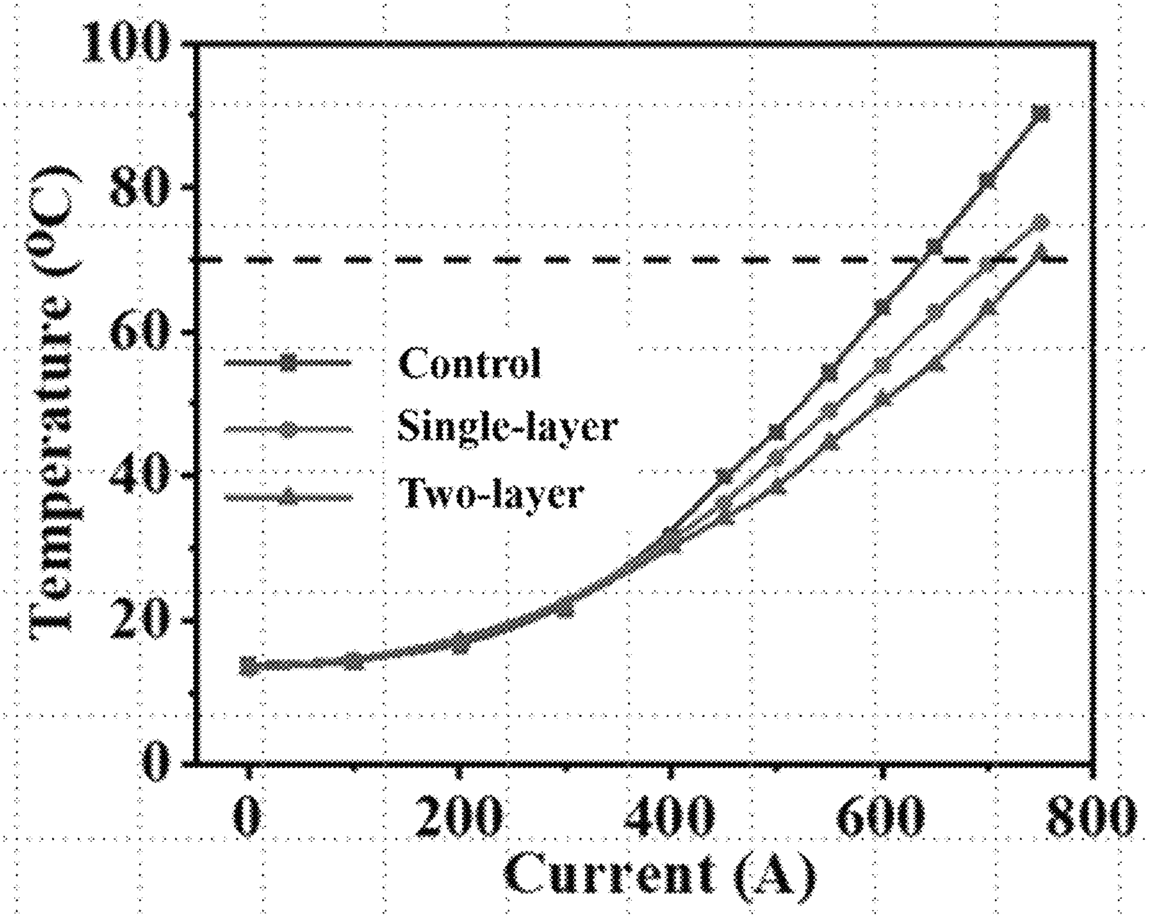
FIG. 7 is a graph showing the heat dissipation of conductors under high current conditions.

FIG. 7 shows the heat dissipation results under high current conditions. In this embodiment, the alumina film formed on the aluminum conductor has a thickness of 30 μm and a pore spacing of approximately 200 nm (with minor variations between single-layer and two-layer composite porous structures). The results demonstrate that the porous alumina film structure provided by the present invention is applicable to amapacity enhancement of the conductor.

4. Temperature Rise Results of Conductors with Different Porous Structures

Figure 8:
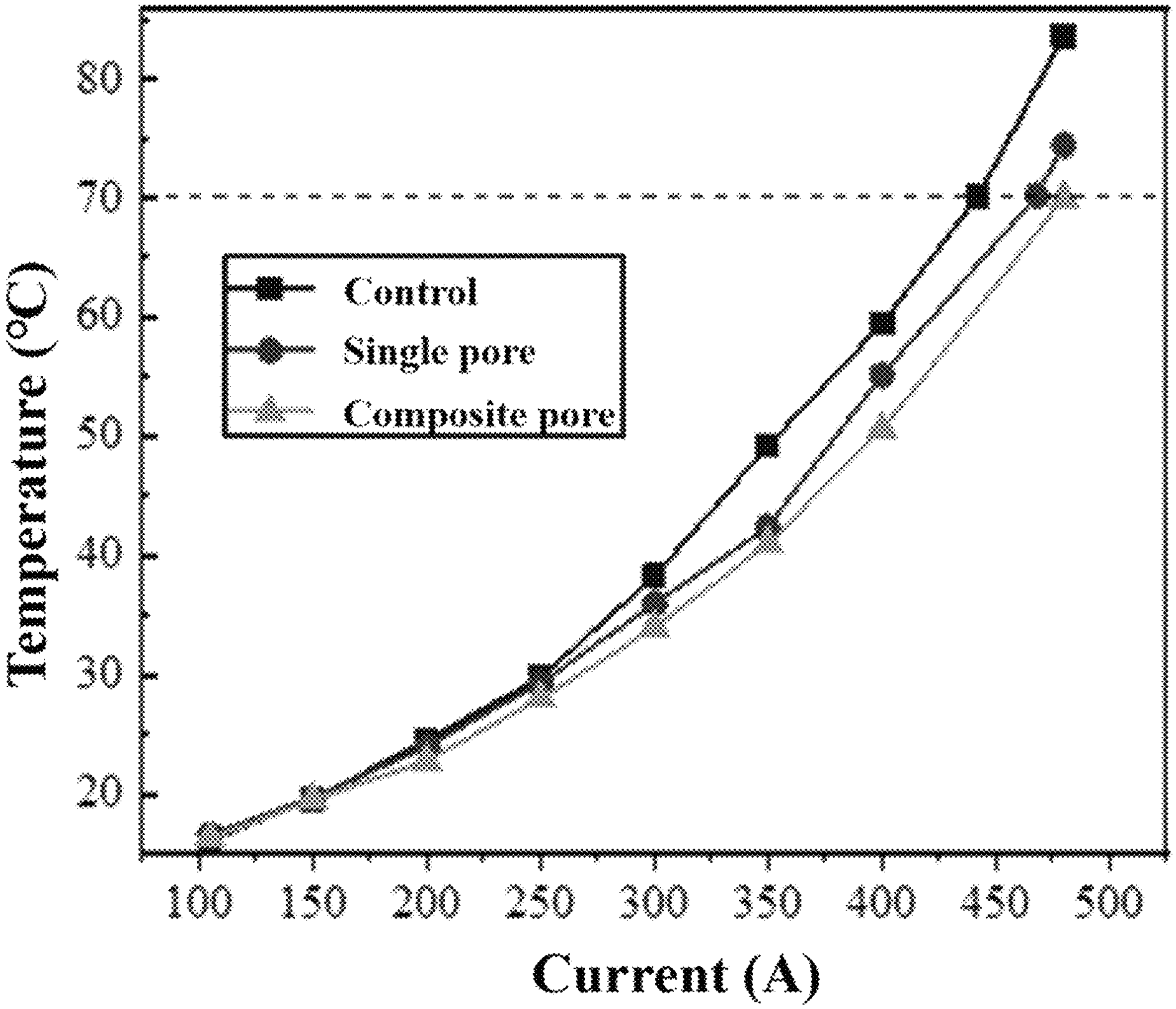
FIG. 8 is a graph showing the temperature rise of conductors with different porous structures.

FIG. 8 shows the temperature rise results of conductors with different porous structures. A bare aluminum conductor is used as the control. In the experimental groups, the alumina film on the aluminum conductor has a thickness of approximately 30 μm and a pore spacing of approximately 200 nm (with minor variations between single-layer and two-layer composite porous structures). The results indicate that both types of porous alumina films effectively mitigate temperature rise as current increases.

Figure 9:
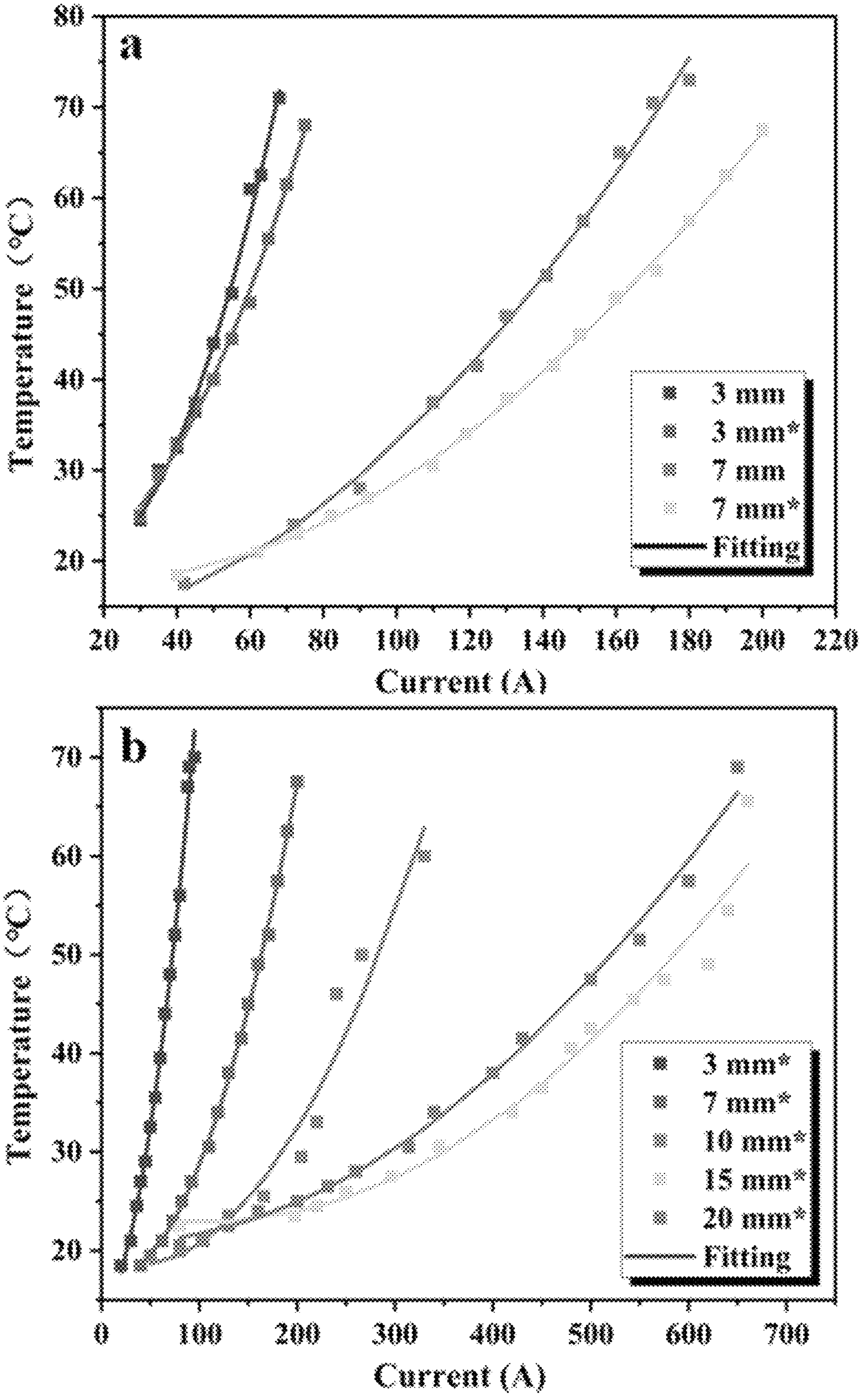
FIG. 9 is a graph showing the temperature rise of conductors with different diameters under applied currents ((a) comparison between control and experimental groups with conductor diameters of 3 mm and 7 mm, and (b) experimental groups with different diameters).

5. Temperature Rise Results of Aluminum Conductors with Different Cross-Sectional Diameters Under Applied Currents FIG. 9*a* shows the temperature rise results of conductors with cross-sectional diameters of 3 mm, 3 mm*, 7 mm, and 7 mm* under applied currents. Conductors marked with an asterisk (*) indicate the presence of the porous alumina film structure of the present invention, while unmarked conductors serve as all-aluminum conductor controls. The results indicate that conductors with the alumina film structure exhibit significantly reduced temperature rise. FIG. 9*b* shows the temperature rise results for conductors (with the alumina film structure) with different cross-sectional diameters, indicating that conductors with cross-sectional diameters of 15 mm and 20 mm exhibit reduced temperature rise as current increases.

6. Pore Spacing Formed Under Different Anodized Current Densities

TABLE 3

| Anodized current density (A/cm$^2$) | Pore spacing (nm) |
|---|---|
| 0.04 | 150 |
| 0.13 | 200 |
| 0.27 | 250 |
| 0.3 | 300 |

Figure 10:
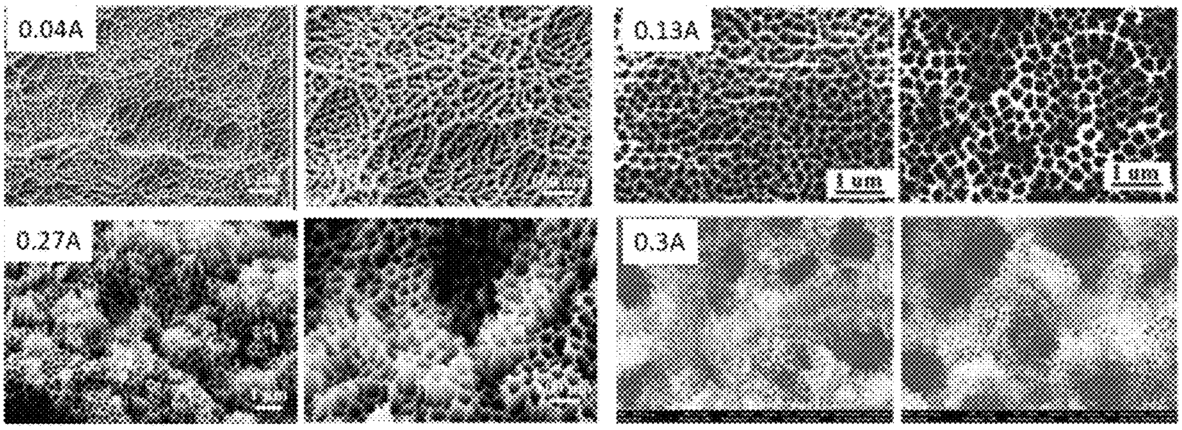
FIG. 10 is an SEM image of the microstructure of pore spacings formed under different anodized current densities.

FIG. 10 shows SEM micrographs of the pore spacing formed under different anodized current densities. It can be understood that by adjusting the anodized current density, the size of the pore spacing of the porous alumina film can be controlled.

7. Effect of Chloride Ion Concentration on the Aluminum Conductor Surface

From the perspective of industrial-scale production and practical application, the anodizing electrolyte in this embodiment is prepared using tap water. During early-stage experimentation, the inventors discovered that chloride ions ($Cl^-$) present in tap water may cause surface corrosion on aluminum conductors.

Figure 11:
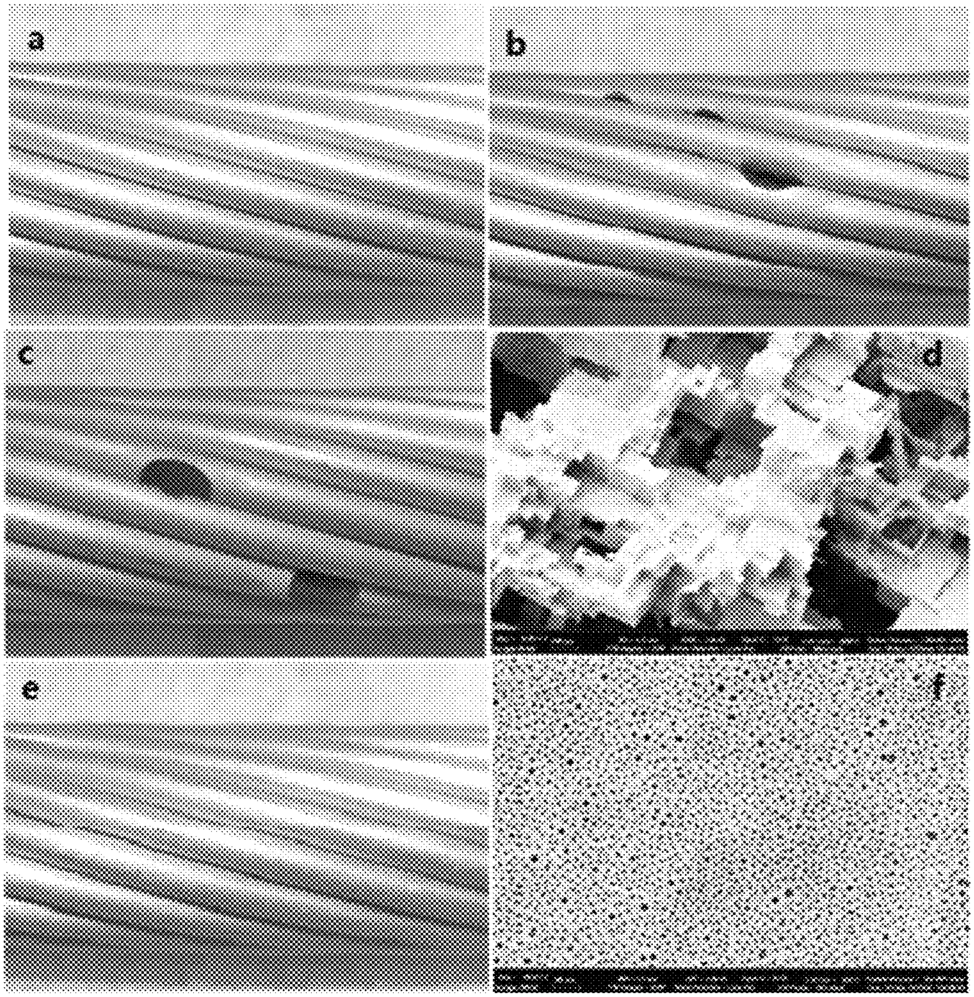
FIG. 11 shows the corrosion effects on the surface of aluminum conductors under different chloride ion concentrations: (a) macroscopic image at 5 mg/L, (b) macroscopic image at 15 mg/L, (c) macroscopic image at 20 mg/L, (d) microscopic image at 20 mg/L, (e) macroscopic image using chloride-free distilled water, (f) microscopic image using chloride-free distilled water.

Experimental results of this embodiment show that: (1) At low $Cl^-$ ion concentrations (e.g., 5 mg/L), no significant surface corrosion is observed, as shown in FIG. 11*a*. (2) At moderate concentrations (e.g., 15 mg/L), small corrosion pits begin to form, as shown in FIG. 11*b*. (3) At higher concentrations (e.g., 20 mg/L), large corrosion pits are observed, as shown in FIGS. 11*c* and 11*d*. (4) By contrast, when the electrolyte is prepared using distilled water (free of $Cl^-$ ions), no surface defects are observed, as shown in FIGS. 11*e* and 11*f*.

Figure 12:
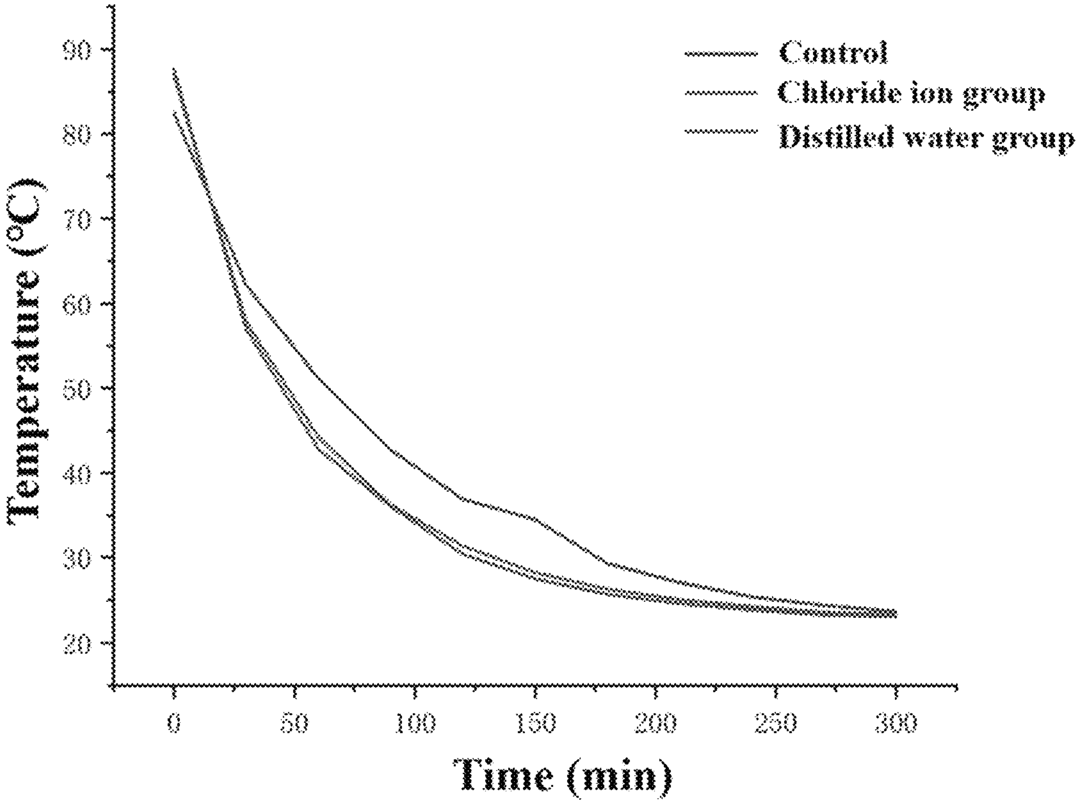
FIG. 12 is a graph showing the heat dissipation performance of aluminum conductors anodized using electrolyte prepared with distilled water versus tap water.

FIG. 12 shows the heat dissipation results of aluminum conductors anodized using electrolytes prepared with either distilled water (distilled water group) or tap water (chloride ion group). The results indicate that the heat dissipation performance is substantially equivalent between the aluminum conductors anodized using electrolytes prepared with either distilled water or tap water.

8. Effect of Anodization Duration on Alumina Film Thickness

Using sulfuric acid as the electrolyte and applying a current density of 0.13 A/cm$^2$, the results are summarized in Table 4. It can be understood that the electrolyte may also be phosphoric acid, oxalic acid, a sulfuric acid/chromic acid mixture, a sulfuric acid/oxalic acid/chromic acid mixture, or a nitric acid/chromic acid mixture.

TABLE 4

| Anodization duration (min) | Alumina film thickness (μm) |
|---|---|
| 5 | 5 |
| 10 | 17.01 |
| 20 | 22.59 |
| 30 | 48.06 |

Figure 13:
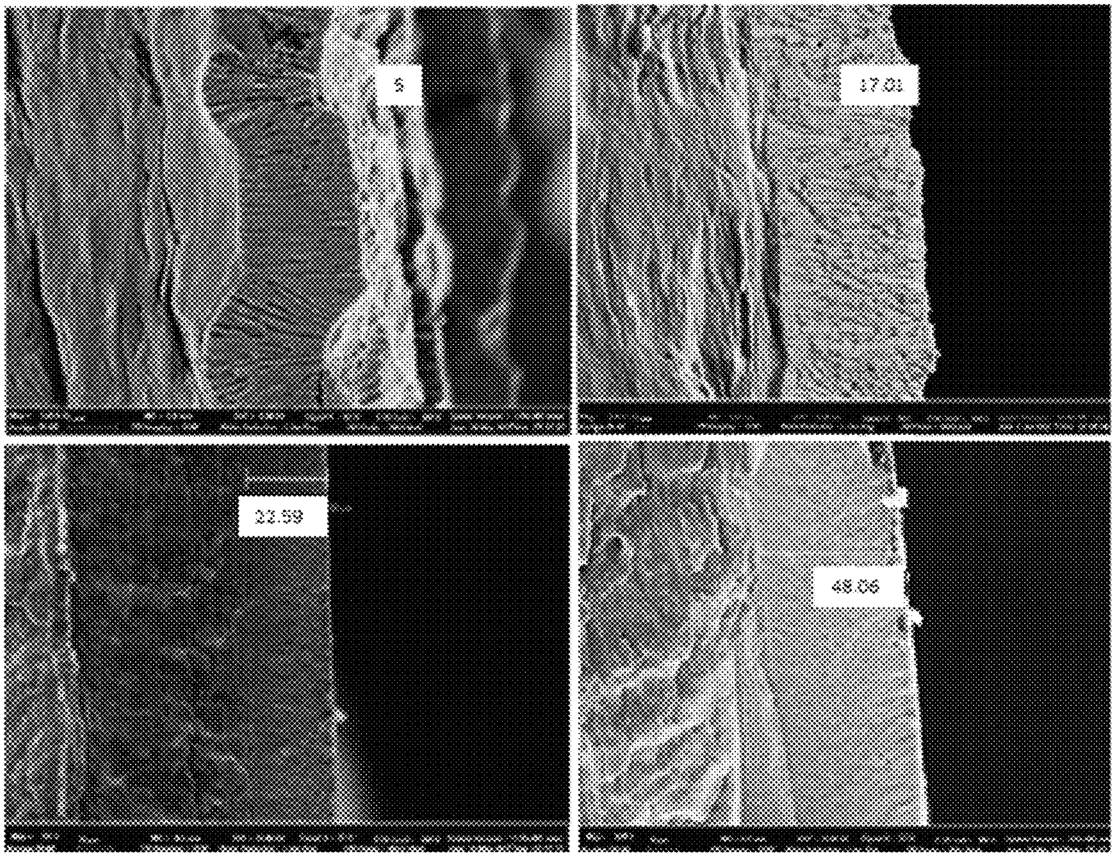
FIG. 13 is an SEM image showing the thickness of alumina film structures formed under different anodization durations.

FIG. 13 shows SEM images showing the thickness of alumina films formed under different anodization durations. It can be understood that the thickness of the alumina film can be controlled by adjusting the anodization duration.

This embodiment further demonstrates that an anodization duration of 8 min results in an alumina film thickness of about 15 μm, whereas anodization durations exceeding 25 min result in film thicknesses greater than 30 μm. As discussed in Section 1 of this embodiment, the optimal film thickness for heat dissipation is within the range of 15~30 μm. Therefore, the anodization duration should be controlled within a range of 8-25 min.

9. Comparison of Electrical Resistivity Between a Conductor with Alumina Film Structure and Bare all-Aluminum Conductor The test is conducted with reference to GB/T 1179-2017, "Round Wire Concentric Lay Overhead electrical Stranded Conductors". The DC resistivity of both untreated JL/LB 20A-240/30 bare aluminum conductors and anodized aluminum conductors is measured, as summarized in Table 5. It is noted that the cross-sectional areas of treated conductor 1 and conductor 2 differ. In this embodiment, the alumina film formed on the aluminum conductors has a thickness of 30 μm and a pore spacing of 200 nm.

TABLE 5

| Line loss data | Bare conductor (control) (240 $mm^2$) | Treated conductor 1 (120 $mm^2$) | Treated conductor 2 (240 $mm^2$) |
|---|---|---|---|
| DC resistance at 20° C. (Ω/km) | 0.1126 | 0.1067 | 0.1117 |

The experimental results demonstrate that the formation of the porous alumina film structure of the present invention on the surface of the aluminum conductors does not lead to an increase in electrical resistance. On the contrary, a slight reduction in resistance compared to bare conductors is observed, thereby challenging conventional understanding in the art.

The embodiments of the present invention are described above with reference to the accompanying drawings, but the present invention is not limited to the aforementioned specific embodiments. The aforementioned embodiments are merely illustrative and not limiting. For those of ordinary skill in the art, many forms can be made under the teaching of the present invention without departing from the spirit of the present invention and the scope of the claims, all of which shall fall within the protection scope of the present invention.

The invention claimed is:

1. An alumina film structure for heat dissipation of a bare conductor under high voltage, wherein the alumina film structure is a porous alumina film layer formed on a surface of an outermost layer of an aluminum conductor or an aluminum stranded conductor, the porous alumina film layer comprises a single-layer or two-layer composite porous structure; a thickness of the porous alumina film layer is 15-30 μm; a pore spacing of the single-layer or two-layer composite porous structure is in the range of 100~300 nm; a pore diameter of the single-layer or two-layer composite porous structure is in the range of 30~300 nm.

2. The alumina film structure according to claim 1, wherein the bare conductor under high voltage is an all-aluminum conductor or an Aluminum Conductor Steel-Reinforced, an outermost layer of the Aluminum Conductor Steel-Reinforced is a single wire of aluminum; a diameter of the bare conductor under high voltage comprises 3 mm, 7 mm, 10 mm, 15 mm, or 20 mm.

3. A preparation method for the alumina film structure according to claim 1, wherein the method comprises immersing an all-aluminum conductor or an aluminum stranded conductor in an electrolyte and performing an anodization process to form a porous alumina film structure with a thickness of 15-30 μm, comprising the following steps:

Step 1: connecting an all-aluminum conductor or an aluminum stranded conductor to an anode output of a power supply of a device, and starting a circulating cooling system of the device before the anodization process to ensure that the electrolyte is cooled via circulation between a cooler and an electrolytic tank and is maintained at 25° C. during the anodization process;

Step 2: preparing the electrolyte by mixing water and an acid solution, and adding the electrolyte into the electrolytic tank; wherein the electrolyte comprises sulfuric acid, phosphoric acid, oxalic acid, a sulfuric acid/chromic acid mixture, a sulfuric acid/oxalic acid/chromic acid mixture, or a nitric acid/chromic acid mixture;

Step 3: turning on the power supply and performing the anodization process by applying a current density of 0.04 $A/cm^2$~0.3 $A/cm^2$ for an anodization duration of 8 min~25 min.

4. The preparation method according to claim 3, wherein the current density is controlled by regulating a voltage during the anodization process, and the voltage is in the range of 50 V~100 V.

5. The preparation method according to claim 3, wherein the current density comprises 0.04 $A/cm^2$, 0.13 $A/cm^2$, 0.27 $A/cm^2$, or 0.3 $A/cm^2$.

6. The preparation method according to claim 3, wherein the anodization duration comprises 8 min, 10 min, 20 min, or 25 min.

7. The preparation method according to claim 3, wherein a concentration of a chloride ion in the water is controlled within the range of 0-15 mg/L.

8. The preparation method according to claim 4, wherein the voltage is in the range of 70 V-90 V.

9. Use of a porous alumina film structure in heat dissipation of a bare conductor under high voltage, wherein a thickness of the porous alumina film structure is 15-30 μm; the porous alumina film structure is a single-layer or two-layer composite porous structure; a pore spacing of the single-layer or two-layer composite porous structure is in the range of 100~300 nm; a pore diameter of the single-layer or two-layer composite porous structure is in the range of 30~300 nm; the porous alumina film structure is for heat dissipation of a conductor after amapacity enhancement.

* * * * *